United States Patent
Weber et al.

(10) Patent No.: US 11,366,887 B2
(45) Date of Patent: Jun. 21, 2022

(54) BIOMETRIC AUTHENTICATION

(71) Applicant: Fingerprint Cards AB, Gothenburg (SE)

(72) Inventors: Sebastian Weber, Malmö (SE); David Burnett, San Mateo, CA (US)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 66 days.

(21) Appl. No.: 16/490,166

(22) PCT Filed: Mar. 7, 2018

(86) PCT No.: PCT/SE2018/050217
§ 371 (c)(1),
(2) Date: Aug. 30, 2019

(87) PCT Pub. No.: WO2018/164630
PCT Pub. Date: Sep. 13, 2018

(65) Prior Publication Data
US 2020/0004941 A1    Jan. 2, 2020

Related U.S. Application Data

(60) Provisional application No. 62/469,158, filed on Mar. 9, 2017.

(30) Foreign Application Priority Data

Mar. 20, 2017 (SE) .................................. 1750330-1

(51) Int. Cl.
*G06F 21/32*        (2013.01)
*G06F 21/60*        (2013.01)
(Continued)

(52) U.S. Cl.
CPC ............ *G06F 21/32* (2013.01); *G06F 21/602* (2013.01); *G06F 21/6209* (2013.01);
(Continued)

(58) Field of Classification Search
CPC .... G06F 21/32; G06F 21/602; G06F 21/6209; G06K 9/0008; G06K 9/00087; H04L 9/0643
(Continued)

(56) References Cited

U.S. PATENT DOCUMENTS 5,790,668 A * 8/1998 Tomko ..................... G07C 9/27
                                                    713/186
5,991,408 A * 11/1999 Pearson ................ H04L 9/3231
                                                    382/116
(Continued)

FOREIGN PATENT DOCUMENTS

CN         106302336 A       1/2017

OTHER PUBLICATIONS

Extended European Search Report dated Nov. 25, 2020 for EP Application No. 18764726.8, 6 pages.
(Continued)

*Primary Examiner* — Dant B Shaifer Harriman
(74) *Attorney, Agent, or Firm* — RMCK Law Group, PLC

(57) ABSTRACT

The present disclosure generally relates to methods for enrolling a user of an electronic device and authentication the user of the electronic device. The electronic device comprising a biometry sensor for acquiring sensing signals representative of a biometric feature, and a processor for computing a verification representation based on said sensing signals. The electronic device further includes a secure module isolated from said processor for computing an encrypted representation of said enrollment representation.

17 Claims, 6 Drawing Sheets

(51) Int. Cl.
*G06F 21/62* (2013.01)
*H04L 9/06* (2006.01)
*G06V 40/12* (2022.01)

(52) U.S. Cl.
CPC ...... *G06V 40/1359* (2022.01); *G06V 40/1365* (2022.01); *H04L 9/0643* (2013.01)

(58) Field of Classification Search
USPC ......................................................... 713/186
See application file for complete search history.

(56) References Cited

U.S. PATENT DOCUMENTS

| | | | |
|---|---|---|---|
| 5,995,630 A * | 11/1999 | Borza | G07C 9/37 380/278 |
| 7,548,981 B1 * | 6/2009 | Taylor | H04L 63/0861 709/227 |
| 9,037,851 B2 * | 5/2015 | Choi | H04W 12/069 713/159 |
| 9,161,227 B1 * | 10/2015 | Bye | H04W 12/08 |
| 9,374,370 B1 | 6/2016 | Bent et al. | |
| 9,471,765 B1 * | 10/2016 | Setterberg | G06V 40/1365 |
| 2002/0025062 A1 | 2/2002 | Black | |
| 2004/0177243 A1 * | 9/2004 | Worley, Jr. | G06F 9/5077 713/2 |
| 2005/0281439 A1 * | 12/2005 | Lange | G06K 9/00496 382/115 |
| 2006/0125640 A1 * | 6/2006 | Oakes | G08B 13/244 235/375 |
| 2006/0226951 A1 | 10/2006 | Aull et al. | |
| 2009/0240950 A1 * | 9/2009 | Suzuki | H04L 9/3231 713/189 |
| 2013/0308838 A1 * | 11/2013 | Westerman | G06F 21/602 382/125 |
| 2014/0210589 A1 | 7/2014 | Grace | |
| 2014/0344921 A1 * | 11/2014 | Hamlin | G06F 21/32 726/19 |

OTHER PUBLICATIONS

PCT International Search Report and Written Opinion dated May 15, 2018 for International Application No. PCT/SE2018/050217, 9 pages.

* cited by examiner

BIOMETRIC AUTHENTICATION

CROSS-REFERENCE TO RELATED APPLICATIONS

This application is a 371 U.S. National Stage of International Application No. PCT/SE2018/050217, filed Mar. 7, 2018, which claims the benefit of priority to U.S. Provisional Application No. 62/469,158, filed Mar. 9, 2017 and priority to Swedish Patent Application No. 1750330-1, filed Mar. 20, 2017. The disclosures of each of the above applications are incorporated herein by reference in their entirety.

TECHNICAL FIELD

The present disclosure generally relates to a method for enrolling a user of an electronic device and to a method for authentication of a user of the electronic device. The disclosure further relates to such an electronic device.

BACKGROUND

Various types of biometric systems are used more and more in order to provide an increased security for accessing an electronic device and at the same time keep the user convenience at an acceptable level. Such biometric systems include systems for e.g. fingerprint-based authentication, iris-based authentication, and vein-based authentication among others. In particular fingerprint sensors have been successfully integrated in such electronic devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

Biometric systems rely on a computing environment which performs the processing of acquired images or other types of data indicative of a biometric feature of the user. Although spoofs are one concern for secure authentication using biometric systems, another concern is that the biometric authentication process itself may be subject to various attacks, such as for example physical tampering, compromising the security and integrity of the biometric system.

Devices that employ biometric systems for authentication of a user typically include architectural defenses to increase the difficulty of compromising the logical and physical security of the biometric authentication system. For this purpose, the biometric template extraction and matching software may be run in a more secure computing environment. In addition to providing a high level of security, the security architecture has to provide sufficiently fast authentication procedures in order to meet the market requirements with regards to processing speed.

US 2014/0210589 discloses an example of a fingerprint sensor comprising a secure microprocessor for read-out, matching and verification of fingerprint image data. Thus, if the secure element described in US 2014/0210589 is compromised, the attacker will have access to the biometric software itself and the stored template data.

Thus, there appears to be room for improvement with regards to increasing the level of security for biometric authentication.

SUMMARY

In view of above-mentioned and other drawbacks of the prior art, it is an object of the present disclosure to provide methods for biometric authentication with improved security. Another object is to provide an electronic device with improved biometric authentication security.

According to an aspect of the present disclosure, it is therefore provided a method for enrolling a user of an electronic device comprising: a biometry sensor for acquiring sensing signals representative of a biometric feature; a processor for computing an enrollment representation based on the sensing signals; a secure module isolated from the processor for computing an encrypted representation of the enrollment representation, wherein the method comprises: acquiring sensing signals representative of a candidate's biometric feature; based on the sensing signals, determining an enrollment representation by the processor; determining, by the secure module, an encrypted representation of the enrollment representation; storing, in the secure module, the encrypted representation; when the encrypted representation has been established, providing a success signal indicative of successful encryption to the processor, in response to receiving the success signal, storing, by the processor, the enrollment representation.

The present disclosure is based upon the realization that improved biometric authentication security is achieved by a layered architecture of the computing environment performing the authentication. The layered architecture may be considered to comprise multiple computing environments. It is realized that by verifying the integrity of the processor which computes the enrollment representations (and also verification representations as will be described below) in a secure module, a fast and secure way of authentication of a user is possible. With embodiments of the present disclosure, the data (e.g. biometric templates) and software used by the processor which computes enrollment representations (and verification representations) can be confirmed by the isolated secure module. Thus, the integrity of the biometric based decision of authentication is checked by the secure module operating in a separate architectural "layer" from the processor where the decision is taken. Thereby, the overall integrity of a biometric matching event can be controlled, and "biometric non-repudiation" may be provided for the authentication process.

That the secure module is isolated should be interpreted as that the secure module is separated from the processor by being its own entity. In other words, the secure model and the processor are different hardware. Thus, the processor and the secure module operate with their own independent processing capability. However, the secure module and the processor are able to communicate with each other, i.e. the secure module may send data to the processor and receive data from the processor, and the processor may send data to the secure module and receive data from the secure module. The communication may be via e.g. a SPI-port (serial peripheral interface), or other internal or external data buses known in the art, or wireless techniques including near field communication (NFC), Bluetooth, Wifi, or other known means for communication of digital signals. The secure module may be a so-called "secure element".

The secure module may advantageously comprise a secure control unit and secure storage unit. The secure storage unit is able to store data, i.e. the secure storage unit may be a "machine-readable media".

According to one embodiment, when the encrypted representation has been determined, the enrollment representation may be discarded from the secure module. This advantageously improves the security further since the enrollment template is not stored together with the encrypted representation of the enrollment template.

In one embodiment, the secure module signs the encrypted representation with a private key unique to the electronic device. Thereby, the encrypted representation may only be used for authentication in one specific electronic device, thereby improving security further, in particular in cases when the encrypted representation is returned to the processor. Additionally, signing the encrypted representation with the private key provides improved defense against attempts to swap the entire set of enrollment templates and/or encrypted representations which may otherwise compromise the security of the authentication procedure. Furthermore, the singing with a private key provides a way to check that the encrypted representation has not been tampered with. The private key may be a digital signature attached to the encrypted representation.

Advantageously, determining the encrypted representation may comprise determining a hash representation of the enrollment representation. A hash representation is determined by applying a cryptographic hash function on the enrollment representation. The cryptographic hash function may create a bit string in a one-way manner, in other words, it is not possible to reverse the function to find out the enrollment representation. Several cryptographic hash functions exist and are as such known in the art. Exemplary cryptographic has functions include SHA-2 and SHA-3.

According to one embodiment, it may be included to send the encrypted representation to the processor, wherein the processor stores the encrypted representation as part of an enrollment template for future verification. In other words, the encrypted representation becomes part of the template such that the encrypted representation may become part of an authentication procedure.

The biometry sensor may be a fingerprint sensor whereby the biometric feature is a fingerprint pattern.

The fingerprint sensor may be implemented using any kind of current or future fingerprint sensing principle, including for example capacitive, optical, or thermal sensing technology. However, at present capacitive sensing is most preferred. Both one and two-dimensional sensors are possible and within the scope of the disclosure. Furthermore, the electronic device may advantageously be a mobile phone. However, other electronic devices are of course thinkable such as tablets, laptops desktop computers, etc.

With a capacitive fingerprint sensor, a measure is detected indicative of the capacitive coupling between each sensing element in an array of sensing elements and a finger surface touching the fingerprint sensor surface. Sensing elements at locations corresponding to ridges in the fingerprint will exhibit a stronger capacitive coupling to the finger than sensing elements at locations corresponding to valleys in the fingerprint. Both one and two-dimensional sensors are possible and within the scope of the disclosure. Furthermore, the electronic device may advantageously be a mobile phone. However, other electronic devices are of course thinkable such as tablets, a laptop computer, a desktop computer, a smart card, smart watch, etc.

According to one embodiment, the processor may be operable in a trusted execution environment. A trusted execution environment may be a secure area of a processor, i.e. part of the processing capability of the processor is operable in a secure environment. The security of the trusted execution environment being upheld by software based protection. In other words, the processor may perform the steps of the method in a secure area of the processor, or the entire processor may operate in a trusted execution environment. The data (i.e. templates, and representations) and software in the trusted execution environment is isolated by software from the area of the processor outside the trusted execution environment. Trusted execution environments as such are known to the person skilled in the art.

According to a second aspect of the present disclosure, there is provided a method for authenticating a user of an electronic device comprising: a biometry sensor for acquiring sensing signals representative of a biometric feature; a processor for computing an verification representation based on the sensing signals; and, a secure module isolated from the processor for computing an encrypted representation of the enrollment representation, wherein the method comprises: acquiring sensing signals representative of a candidate's biometric feature; determining, by the processor, a verification representation based on the sensing signals; comparing, the verification representation with at least one stored enrollment representation; sending, when a match is found between the verification representation and a stored enrollment representation, the enrollment representation to the secure module; determining, by the secure module, an encrypted representation of the enrollment representation and comparing the encrypted representation with at least one stored encrypted representation; when a match is found between the encrypted representation and a stored encrypted representation, providing a pass signal indicative of successful authentication.

Advantageously, the method according to the second aspect ensures that the matched enrollment representation is known to the secure module and has not been modified since it was initially observed by the secure module in the enrollment process. The enrollment process may be as described in the first aspect.

The pass signal may be provided to the processor, or directly to a main processor of the electronic device, or for example to a terminal to which the biometric authentication allows access, i.e. a card reader for a smart card, the smart card having a biometric authentication system. Furthermore, the pass signal may be provided to an application to which the user is attempting to gain access via the biometric authentication.

According to one embodiment, the method for authenticating a user may comprise: sending, when the match is found between the verification representation and a stored enrollment representation, the enrollment representation and the verification representation to the secure module; when the match is found between the encrypted representation and the stored encrypted representation, comparing, by the secure module, the verification representation with the enrollment representation, wherein, when the verification representation is determined to match the enrollment representation, providing the pass signal indicative of successful authentication. In other words, the secure module performs another matching step between the verification representation and the enrollment representation after the encrypted enrollment representations. Thereby a higher confidence level can be asserted about the biometric authentication compared to only performing the matching in the processor.

According to one embodiment, determining an encrypted representation may comprise determining a hash representation of the enrollment representation or the verification representation.

This second aspect of the present disclosure provides similar advantages as discussed above in relation to the first aspect of the present disclosure.

According to third aspect of the present disclosure, there is provided an electronic device comprising: a biometry sensor for acquiring sensing signals representative of a biometric feature; a processor configured to compute a verification representation and an enrollment representations based on sensing signals acquired by the biometry sensor, a secure module configured to: determine encrypted representations of at least the enrollment representation, and store an encrypted enrollment representation for future authentication.

According to one embodiment, for enrolling a user of the electronic device: the processor may be configured to determine the enrollment representation, the secure module may be configured to determine and store the encrypted representation of the enrollment representation, wherein when the encrypted representation of the enrollment representation is established, the secure module may be configured to send a success signal to the processor, wherein in response to receiving the success signal the processor may be configured to store the enrollment representation for future authentication.

According to one embodiment, for authenticating a user of the electronic device the processor is configured to: determine the verification representation; compare the verification representation with at least one stored enrollment representation, and send, when a match is found between the verification representation and a stored enrollment representation, the enrollment representation to the secure module; wherein the secure module is configured to: determine an encrypted representation of the enrollment representation and compare the encrypted representation with at least one stored encrypted representation, and when a match is found between the encrypted representation and a stored encrypted representation, provide a pass signal indicative of successful authentication.

According to one embodiment, the processor may be configured to: send, when the match is found between the verification representation and a stored enrollment representation, the enrollment representation and the verification representation to the secure module, wherein the secure module is configured to: compare, when the match is found between the encrypted representation and the stored encrypted representation, the verification representation with the enrollment representation, wherein, the secure module is further configured to provide the pass signal when the verification representation matches the enrollment representation.

The electronic device may be a mobile phone such as e.g. a smartphone. However, the electronic device may equally well be a tablet, a laptop computer, a desktop computer, a smart card, smart watch, etc.

In the context of the present application, the "enrollment representation" and/or the "verification representation" of a fingerprint image may be any information extracted from the fingerprint image, which is useful for assessing the similarity between fingerprint images acquired at different times. For instance, the enrollment/verification representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized.

Various ways of extracting such verification representation or enrollment representation from a fingerprint image are well-known to a person of ordinary skill in the relevant art.

Authentication may comprise multiple steps, one step being the process thereof of deciding whether a biometric feature comes from the same individual as an enrolled biometric feature. This process is commonly denoted verification.

This third aspect of the present disclosure provides similar advantages as discussed above in relation to the first aspect and the second aspect of the present disclosure.

In summary, the present disclosure generally relates to methods for enrolling a user of an electronic device and authentication the user of the electronic device. The electronic device comprising a biometry sensor for acquiring sensing signals representative of a biometric feature, and a processor for computing a verification representation based on said sensing signals. The electronic device further includes a secure module isolated from said processor for computing an encrypted representation of said enrollment representation.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
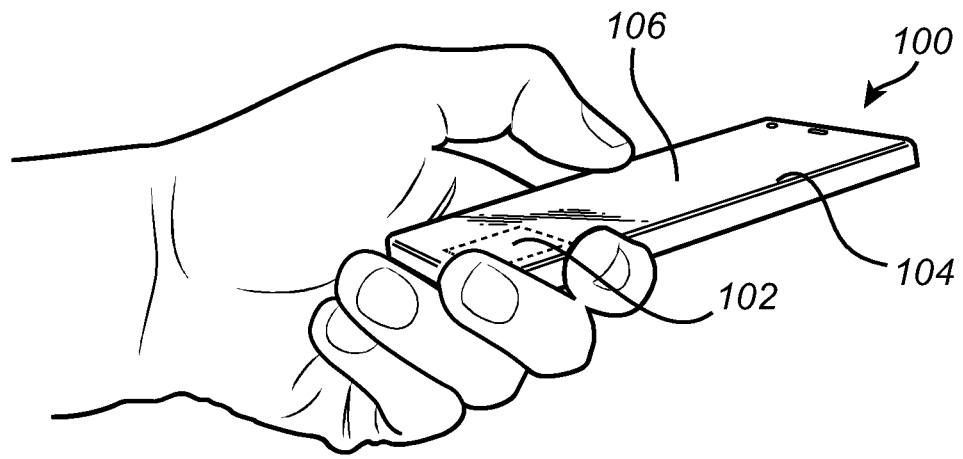
FIG. 1 schematically exemplify an electronic device according to the present disclosure, in the form of a mobile phone comprising a biometric sensor in the form of an integrated fingerprint sensor.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. For example, the present disclosure will be described with reference to a fingerprint sensor, however, other biometric authentication systems are equally well applicable such as iris-based and vein-based biometric systems. Like reference characters refer to like elements throughout the drawings.

Turning now to the drawings and to FIG. 1 in particular, there is schematically illustrated the electronic device according to the present disclosure, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that embodiments of the present disclosure may be applicable in relation to any other type of electronic device, such as a laptop, a remote control, a tablet computer, a smart card, smart watch, or any other type of present or future similarly configured device.

Figure 2:
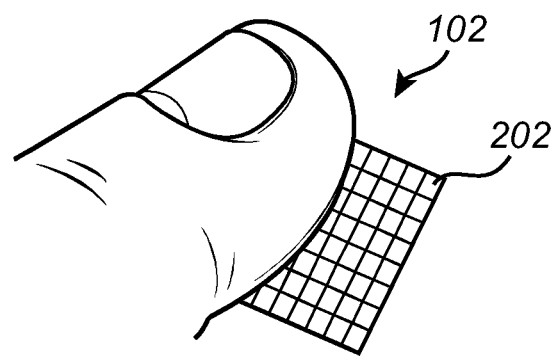
FIG. 2 schematically shows a fingerprint sensor array comprised in the electronic device in FIG. 1.

With reference to FIG. 2, there is conceptually illustrated a somewhat enlarged view of the fingerprint sensor 102. The fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the present disclosure, including two-dimensional array with less pixels as compared to the above example. A single sensing element (also denoted as a pixel) is in FIG. 2 indicated by reference numeral 202.

Figure 3:
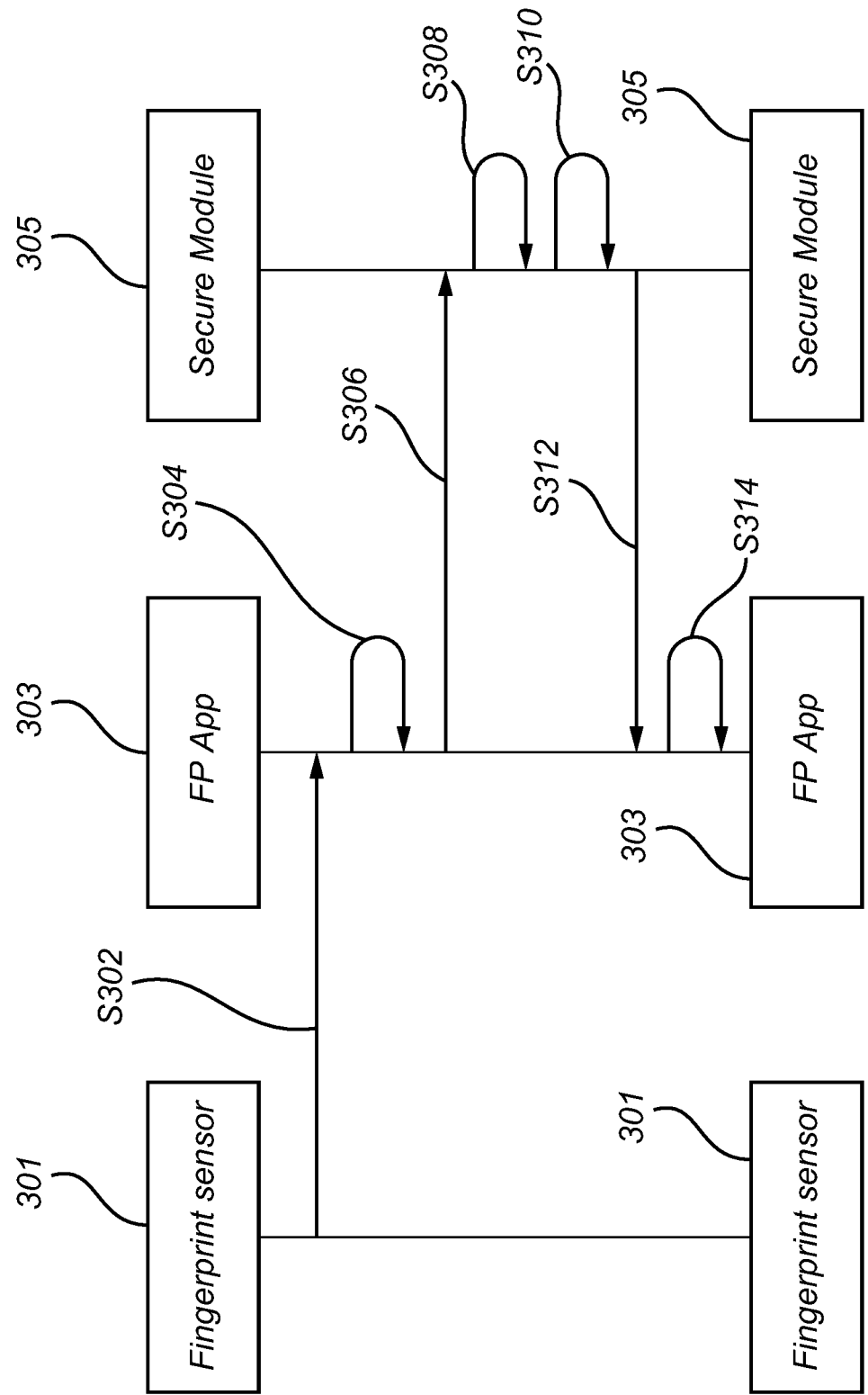
FIG. 3 conceptually illustrates a timing diagram according to an example embodiment.

Now with reference to FIG. 3 conceptually illustrating a timing diagram of an enrollment procedure according to an exemplary embodiment of the present disclosure. For initiating an enrollment process, sensing signals representative of a biometric feature of a candidate is firstly acquired by a biometry sensor such as for example a fingerprint sensor 301, in such case the sensing signals may be representative of an image of the fingerprint pattern of the candidate. The sensing signals, e.g. the fingerprint image are sent S302 to a processor (not shown) running an application 303 for computing enrollment representations. Thus, the application 303 running on the processor determines S304 an enrollment representation (i.e. an enrollment template) based on the sensing signals. A secure module 305 next receives the enrollment representation S306. The secure module 305 which is isolated from the processor, i.e. the secure module 305 comprises its own processing circuitry (see e.g. FIG. 5), computes and stores S308 an encrypted representation of the enrollment representation. Optionally, the secure module 305 discards S310 the enrollment representation. The encrypted representation of the enrollment representation may for example be a hash for the enrollment representation. When the secure module has successfully computed and stored the encrypted representation, a success signal is sent S312 to the processor running the application 303, the signal being indicative of that the encrypted representation was successfully calculated and stored. In response to the success signal, the processor stores S314 the enrollment representation as an enrollment template. The enrollment template may be used for subsequent verification. In addition, and optionally, the secure module 305 may return the encrypted representation to the processor, for example if the secure module 305 lacks storage space to store the encrypted representation. In some embodiments, the secure module 305 stores the encrypted representation.

Figure 4:
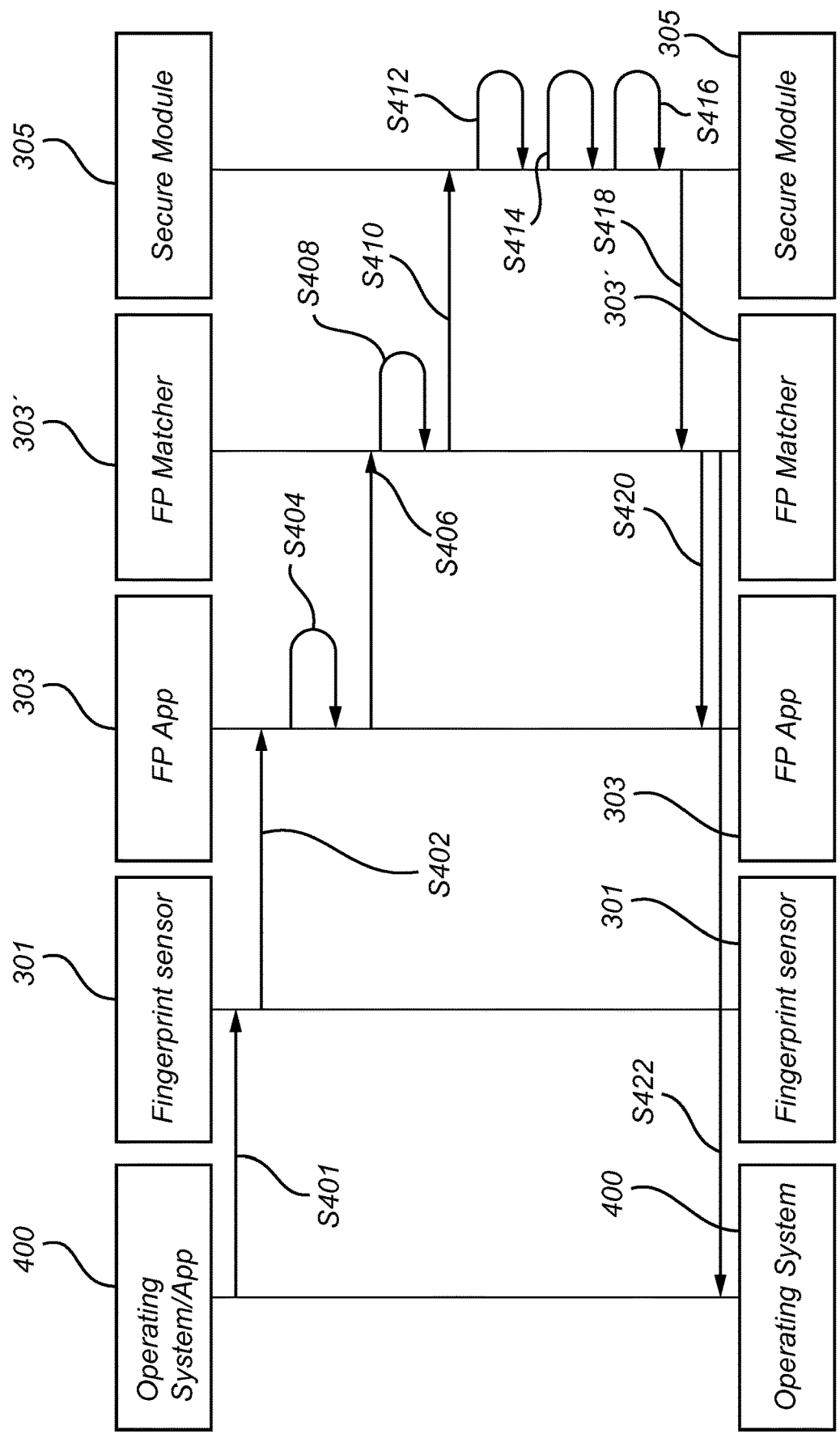
FIG. 4 conceptually illustrates a timing diagram according to an example embodiment.

FIG. 4 conceptually illustrating a timing diagram of a verification procedure for authentication of a user according to an exemplary embodiment of the present disclosure. An operating system 400, or application 400 may request a scan for a biometric feature, whereby sensing signals representative of a biometric feature of a candidate is firstly acquired S401 by a biometry sensor such as for example a finger print sensor 301, in such case an image representative of the fingerprint pattern of the candidate is acquired. The sensing signals, e.g. the fingerprint image are sent S402 to a processor (not shown) running an application 303 for computing verification representations. Thus, the application 303 determines S404 a verification representation (i.e. an enrollment template) based on the sensing signals. Next S406, the verification representation is compared with at least one stored enrollment representation (e.g. an enrollment template). If a match is found (S408) between the verification representation and an enrollment representation, the enrollment representation is sent S410 to the secure module 305. The matching (S408) may be performed by an application 303' separate from the application 303 used for creating the verification representation. Both applications 303 and 303' may be running on the processor 302.

With further reference to FIG. 4, when a match is found (S408), the enrollment representation is provided S410 to the secure module 305. The secure module 305 determines S412 an encrypted representation of the enrollment representation, for example, the encrypted representation may be a hash of the enrollment representation. Next S414, the secure module 305 attempts to match the encrypted representation of the enrollment representation with a stored encrypted enrollment representation, and if a match is found, a pass signal is provided (S418, S420, S422) indicative that the encrypted enrollment representation matches with a stored encrypted enrollment representation. Matching the encrypted representation of the enrollment representation with a stored encrypted enrollment representation ensures that the enrollment representation is known to the secure module 305 and has not been modified since initially observed by the secure module 305. The pass signal may be provided to the applications 303 or 303', or directly to the application or operating system 400. The pass signal may optionally include a digital signature (including a private key) of the electronic device.

Optionally, the processor 302 (running application 303) sends both the enrollment representation and the verification representation S410 to the secure module 305. In such case, the secure module may, subsequent to having found S414 a match between the encrypted enrollment representation and a stored encrypted enrollment representation, compare S416 the verification representation with the enrollment representation to confirm the matching result obtained by the processor 302 (e.g. application 303'). When the verification representation is determined to match (S416) the enrollment representation, the pass signal indicative of successful authentication is provided (S418, S420, S422). This provides even higher confidence level of the biometric authentication. In some embodiments, the processor running the applications 303, 303' is operative in a trusted execution environment.

Figure 5:
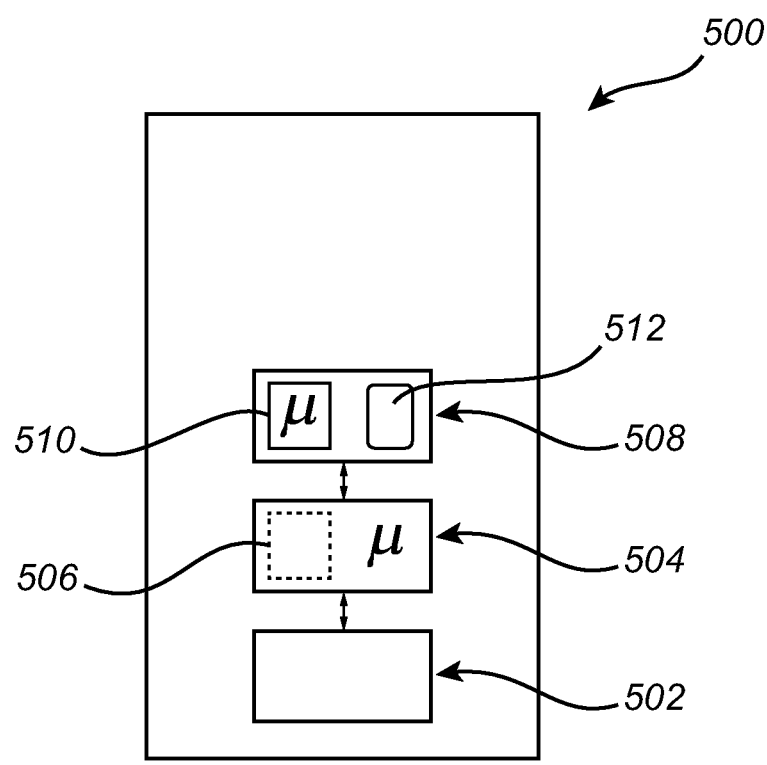
FIG. 5 conceptually an electronic device according to an embodiment of the present disclosure.

Now turning to FIG. 5 conceptually illustrating an electronic device 500 comprising a biometry sensor 502 for acquiring sensing signals representative of a biometric feature, and a processor 504 configured to compute a verification representation and an enrollment representations based on sensing signals acquired by the biometry sensor 502. The processor 504 may be running one or more applications configured to compute the representations and performing biometric matching between a verification representation and an enrollment representation. The electronic device 500 further comprises a secure module 508 configured to determine encrypted representations of the enrollment representation, and store an encrypted enrollment representation for future authentication. For storing of for example encrypted representations, the secure module 508 comprises a secure storage unit 512. In addition, the secure module 508 comprises a secure control unit 510. The secure module comprises its own hardware and is thus separated from the processor 504 running the applications for computing the representations and performing biometric matching between a verification representation and an enrollment representation. The secure module 508 may receive/send data from/to the processor 504 and vice versa, but is otherwise isolated from the processor. The secure module 508 may for example be "secure element". The communication between the processor and the secure module may be via e.g. a SPI-port (serial peripheral interface), or other internal or external data buses known in the art, or wireless techniques including near field communication (NFC), Bluetooth, Wifi, or other known means for communication of digital signals.

In addition, with further reference to FIG. 5, the processor 504 may be operative in a secure environment such as a trusted execution environment 506. For example, the applications may be run in the trusted execution environment 506 for enhanced security.

Figure 6:
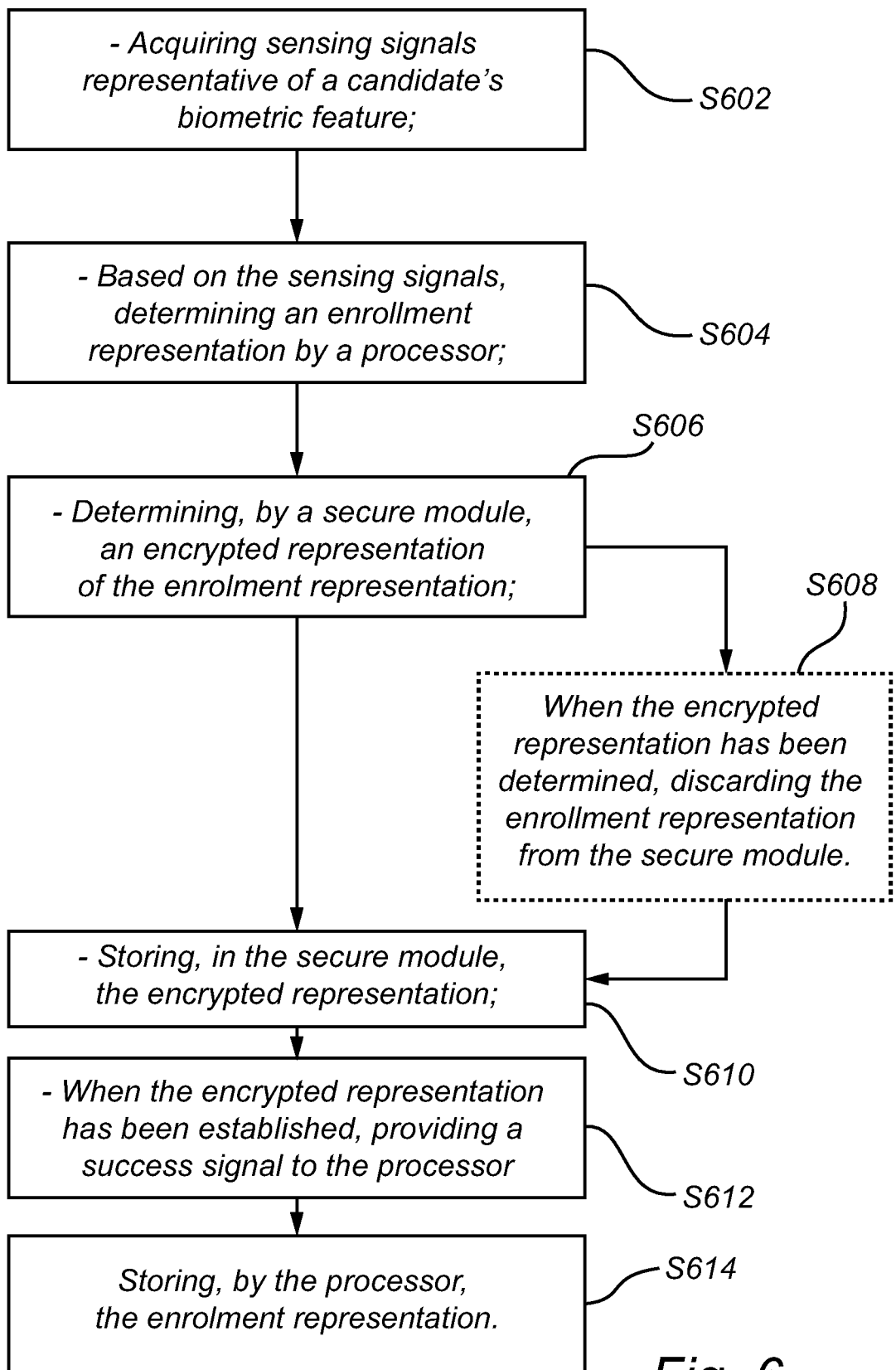
FIG. 6 is a flow-chart of method steps according to embodiments of the present disclosure.

FIG. 6 illustrates a flow-chart according to embodiments of the present disclosure. The embodiments illustrated by the flow-chart in FIG. 6 relate to a method for enrolling a user of an electronic device. In a first step S602 sensing signals are acquired representative of a candidate's biometric feature. Based on the sensing signals, an enrollment representation is determined S604 by a processor (e.g. processor 302 or 504). Next S606, an encrypted representation of the enrollment representation is determined by a secure module (e.g. secure module 305 or 508). The encrypted representation is stored S610 in the secure module. When the encrypted representation has been established, a success signal indicative of successful encryption is provided S612 to the processor. In response to receiving the success signal the processor stores S614 the enrollment representation. Optionally, when the encrypted representation has been determined, the enrollment representation is discarded S608 from the secure module.

Figure 7:
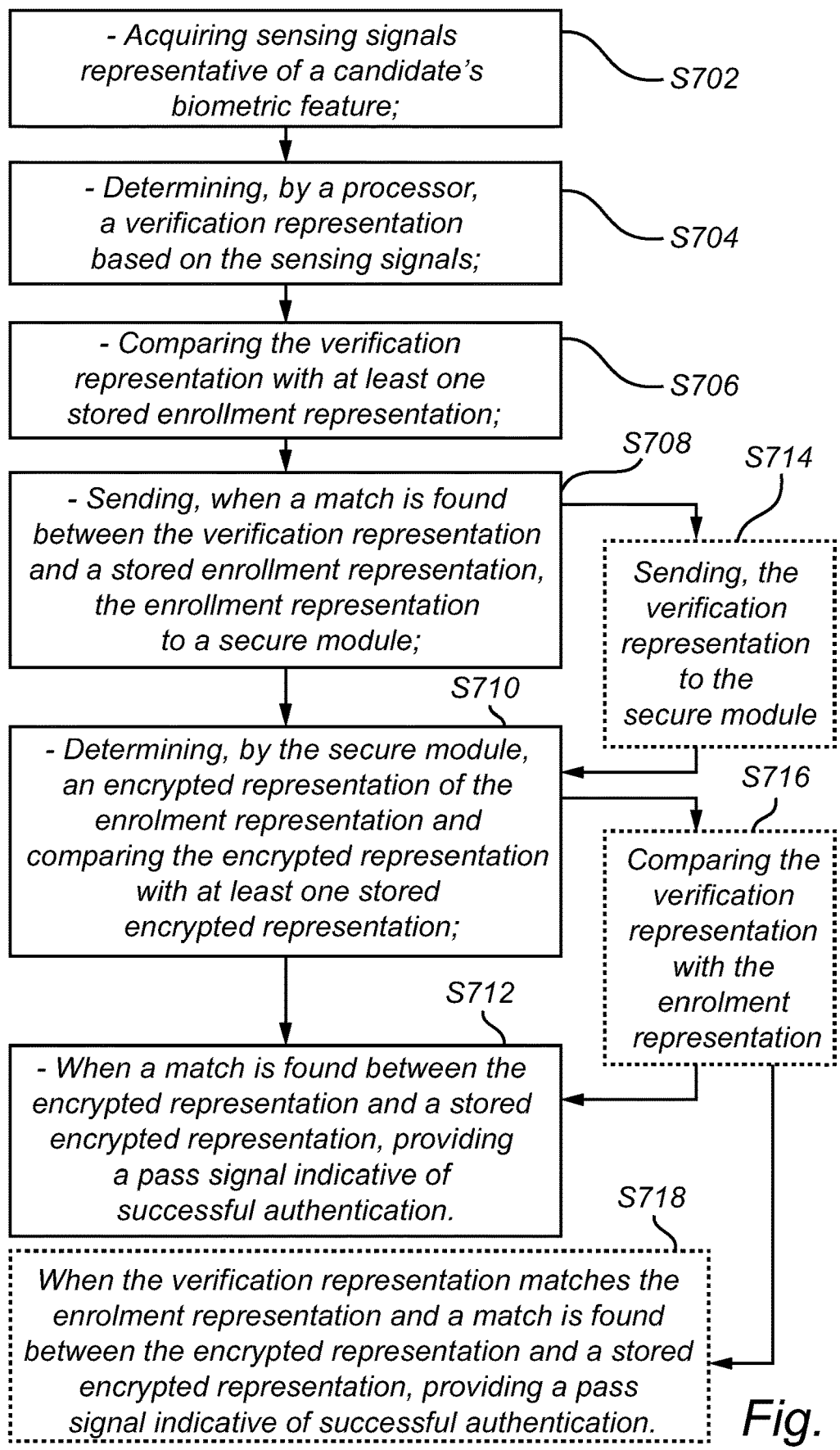
FIG. 7 is a flow-chart of method steps according to embodiments of the present disclosure.

Turning now to FIG. 7 which illustrates a flow-chart according to embodiments of the present disclosure. The embodiments illustrated by the flow-chart in FIG. 7 relate to a method for authenticating a user of an electronic device. In a first step S702, sensing signals representative of a candidate's biometric feature is acquired. Next S704, a verification representation based on the sensing signals is determined by a processor. The verification representation is compared S706 with at least one stored enrollment representation. When a match is found between the verification representation and a stored enrollment representation, the enrollment representation is sent S708 to a secure module. Subsequently S710, an encrypted representation of the enrollment representation is determined by the secure module, and the encrypted representation is compared with at least one stored encrypted representation. When a match is found between the encrypted representation and a stored encrypted representation, a pass signal indicative of successful authentication is provided S712.

With further reference to FIG. 7, optionally the verification representation is also send S714 to the secure module. In such case, the verification representation may be compared S716 with the enrollment representation subsequent to step S710. When a match is found between the encrypted representation and the stored encrypted representation, and the verification representation is determined to match the enrollment representation, the pass signal indicative of successful authentication is provided S718.

Within the context of the present disclosure, in case of the biometric sensor being a fingerprint sensor the expression "fingerprint image" should be interpreted broadly and to include both a regular "visual image" of a fingerprint of a finger as well as a set of measurements relating to the finger when acquired using the fingerprint sensor.

A control unit of embodiments of the present disclosure may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor, or may be part of the electronic device. It should also be understood that the actual implementation of such a control unit may be divided between a plurality of devices/circuits.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for enrolling a user of an electronic device comprising:
    a biometry sensor for acquiring sensing signals representative of a biometric feature;
    a processor for computing an enrollment representation based on said sensing signals;
    a secure processor isolated from said processor for computing an encrypted representation of said enrollment representation, wherein said method comprises:
    acquiring sensing signals representative of a candidate's biometric feature;
    based on said sensing signals, determining an enrollment representation by said processor;
    determining, by said secure processor, an encrypted representation of said enrollment representation;
    when said encrypted representation has been determined, discarding said enrollment representation from said secure processor;
    storing, in said secure processor, said encrypted representation;
    when said encrypted representation has been established, providing a success signal indicative of successful encryption to said processor,
    in response to receiving the success signal, storing, by the processor, the enrollment representation.

2. The method according to claim 1, further comprising:
    signing, by the secure processor, said encrypted representation with a private key unique to said electronic device.

3. The method according to claim 1, wherein determining said encrypted representation comprises determining a hash representation of said enrollment representation.

4. The method according to claim 1, comprising:
    sending the encrypted representation to the processor, wherein the processor stores the encrypted representation as part of an enrollment template for future verification.

5. The method according to claim 1, wherein said biometry sensor is a fingerprint sensor and said biometric feature is a fingerprint pattern.

6. The method according to claim 1, wherein said processor is operable in a trusted execution environment.

7. A method for authenticating a user of an electronic device comprising:
    a biometry sensor for acquiring sensing signals representative of a biometric feature;
    a processor for computing a verification representation based on said sensing signals; and,
    a secure processor isolated from said processor for computing an encrypted representation of said enrollment representation, wherein said method comprises:
    acquiring sensing signals representative of a candidate's biometric feature;
    determining, by said processor, a verification representation based on said sensing signals;
    comparing, said verification representation with at least one stored enrollment representation;
    sending, when a match is found between said verification representation and a stored enrollment representation, said enrollment representation and said verification representation to said secure processor;
    determining, by said secure processor, an encrypted representation of said enrollment representation and comparing said encrypted representation with at least one stored encrypted representation;
    when a match is found between said encrypted representation and a stored encrypted representation, comparing, by said secure processor, said verification representation with said enrollment representation, and, when said verification representation matches said enrollment representation, providing a pass signal indicative of successful authentication.

8. The method according to claim 7, wherein determining an encrypted representation comprises determining a hash representation of said enrollment representation or said verification representation.

9. The method according to claim 7, wherein said biometry sensor is a fingerprint sensor and said biometric feature is a fingerprint pattern.

10. The method according to claim 7, wherein said processor is operable in a trusted execution environment.

11. An electronic device, comprising:
    a biometry sensor for acquiring sensing signals representative of a biometric feature;
    a processor configured to compute a verification representation and an enrollment representations based on sensing signals acquired by said biometry sensor,
    a secure processor configured to:
        determine encrypted representations of at least said enrollment representation, and
        store an encrypted enrollment representation for future authentication, wherein for enrolling a user of said electronic device:
    said processor is configured to determine said enrollment representation,
    said secure processor is configured to determine and store said encrypted representation of said enrollment representation, and when said encrypted representation has been determined, discard said enrollment representation from said secure processor, wherein
    when said encrypted representation of said enrollment representation is established, said secure processor is configured to send a success signal to said processor, wherein
    in response to receiving the success signal the processor is configured to store the enrollment representation for future authentication.

12. An electronic device, comprising:
    a biometry sensor for acquiring sensing signals representative of a biometric feature;
    a processor configured to compute a verification representation and an enrollment representations based on sensing signals acquired by said biometry sensor, a secure processor configured to:
: determine encrypted representations of at least said enrollment representation, and
: store an encrypted enrollment representation for future authentication, wherein for authenticating a user of said electronic device:

said processor is configured to:
: determine said verification representation;
: compare said verification representation with at least one stored enrollment representation, and
: send, when a match is found between said verification representation and a stored enrollment representation, said enrollment representation and said verification representation to said secure processor;

wherein said secure processor is configured to:
: determine an encrypted representation of said enrollment representation and compare said encrypted representation with at least one stored encrypted representation, and
: when a match is found between said encrypted representation and a stored encrypted representation, compare said verification representation with said enrollment representation, and provide a pass signal indicative of successful authentication when said verification representation matches said enrollment representation.

13. The electronic device according to claim 11, wherein said secure processor comprises a secure control unit and secure storage unit.

14. The electronic device according to claim 12, wherein said encrypted representations are hash representations.

15. The electronic device according to claim 12, wherein the electronic device is a mobile phone, a smart card, or a smart watch.

16. The electronic device according to claim 12, wherein said processor is operable in a trusted execution environment.

17. The electronic device according to claim 12, wherein said secure processor comprises a secure control unit and secure storage unit.

* * * * *